June 6, 1939. R. W. HOAG 2,161,675
FOLDING BOX
Filed Oct. 16, 1936   3 Sheets-Sheet 1
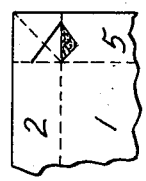
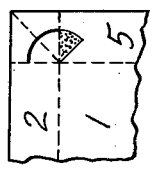
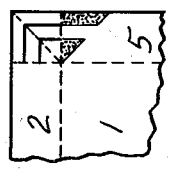
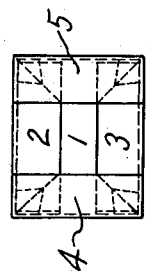
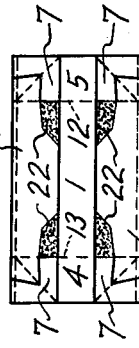
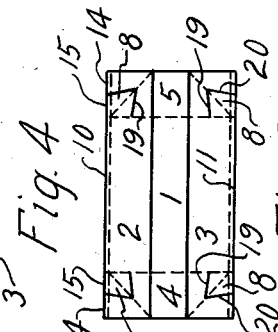
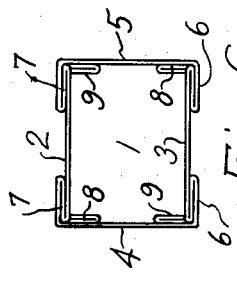
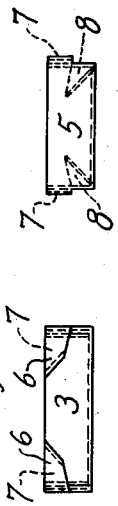
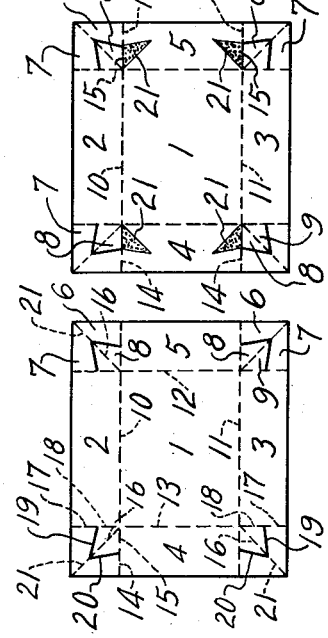
Inventor
Roderick Wm Hoag June 6, 1939.　　　R. W. HOAG　　　2,161,675
FOLDING BOX
Filed Oct. 16, 1936　　　3 Sheets-Sheet 2
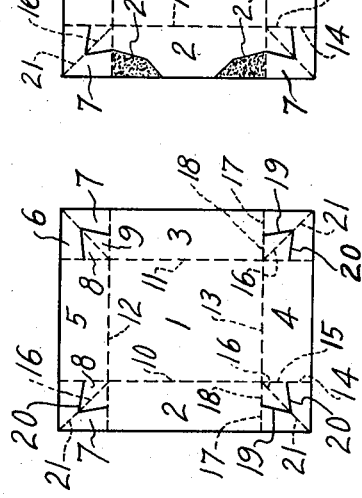
Inventor
Roderick W<sup>m</sup> Hoag June 6, 1939.  R. W. HOAG  2,161,675
FOLDING BOX
Filed Oct. 16, 1936     3 Sheets-Sheet 3

Inventor
Roderick Wm Hoag

Patented June 6, 1939

2,161,675

UNITED STATES PATENT OFFICE 2,161,675

FOLDING BOX

Roderick W. Hoag, Melrose, Mass.

Application October 16, 1936, Serial No. 105,981

3 Claims. (Cl. 229—31)

The invention relates to improvements in folding boxes of the type which automatically lock the walls thereof in upright position upon being brought to such position.

One object of this invention is to provide a self-locking folding box having strong tight corners.

Another and important object of this invention is to provide a box of the type described which may be manufactured economically and at a high rate of speed.

The box herein described may be formed in collapsed condition from a cut and scored blank, by applying adhesive thereto and performing simple folding operations.

With said objects in view, and others hereinafter explained my invention consists in the folding box hereinafter described and claimed.

Of the accompanying drawings:

Figure 1 is a plan view of the blank from which the box may be formed.

Figure 2 is a plan view of the blank showing areas to which adhesive may be applied in making the box.

Figure 3 is a plan view of the blank showing the condition thereof after the front and rear margins of the blank have been folded against center areas of the blank.

Figure 4 is similar to Figure 3 except that areas are shown to which adhesive may be applied in producing the box.

Figure 5 is a plan view of the completed box in flat condition.

Figure 6 is a plan view of the box in set up form.

Figure 7 is a front elevation of the box shown in Figure 6.

Figure 8 is an end elevation of the box shown in Figure 7.

Figures 9, 10 and 11 illustrate modified forms of cuts which may be made in the corner sections of the blank to make boxes of the type disclosed.

Figure 12 is the same as Figure 1 except that it is shown turned at an angle of 90°.

Figures 13 to 16 inclusive, illustrate the progressive steps to be followed in making a modified form of box from the blank shown in Figure 12.

Figure 17 is a plan view of the box shown in Figure 16 after it has been set up for use.

Figure 18 is a front elevation of the box shown in Fig. 17.

Figure 19 is an end elevation of the box shown in Figure 18.

Figure 20:
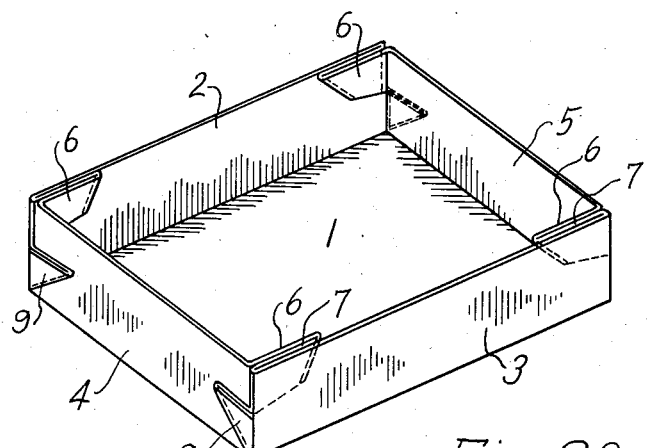

Figure 20 is a perspective view of the box shown in Figures 17, 18 and 19, tilted so as to show a portion of the interior thereof.

Figure 21:
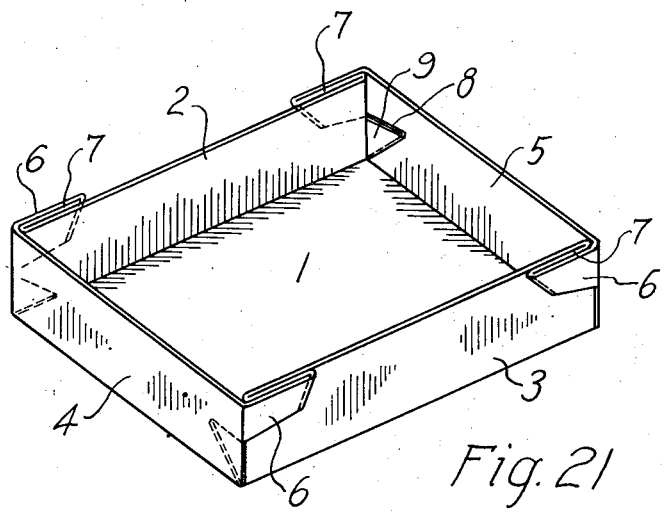

Figure 21 is a perspective view of the box shown in Figures 6, 7 and 8, tilted so as to show a portion of the interior thereof.

Referring to Figure 1, there is illustrated a cut and scored blank of suitable material, such as paper box board, scored lines are represented by dash lines 10 to 18 inclusive, and 21, and cut lines are represented by full lines 19 and 20. The said score lines and cut lines effect a division of the blank to form a bottom section 1 for the box, a rear wall section 2, a front wall section 3, end wall sections 4 and 5, end wall outer segments 6, end wall inner segments 8, front and rear wall outer segments 7, front and rear wall inner segments 9. The said outer segments 6 and 7 form a bellows fold element at each corner of the box when the box is set-up, and likewise each pair of inner segments 8 and 9 form a bellows fold element at each corner when the box is set-up.

In producing the box in collapsed condition from a cut and scored blank (Fig. 1), predetermined areas 21 (Fig. 2) are treated with adhesive so that when the blank is folded on lines 10, 11, 14 and 15 (Figs. 1, 2 and 3), the end wall inner segments 8 will contact the adhesively treated areas 21 (Fig. 2). After said folding operation the blank is in the condition illustrated by Fig. 3. The upward facing surfaces of the front and rear wall sections 3 and 2 (Fig. 4) are then adhesively treated at predetermined areas 22. The end wall sections 4 and 5 together with the corner segments are then folded on lines 12, 13, 17 and 18, thus causing the front and rear wall outer segments 7 to contact the adhesively treated areas 22 to complete the box in collapsed condition ready to be instantly set up for use.

When it is desired to set up the box for use, the front and rear walls 3 and 2 are simply raised and bent outward, whereupon the front and rear wall inner segments 9 in each corner will automatically snap into position parallel with the corresponding end wall section, thus automatically locking and keeping the box in upright position, the said segments 9 constituting keepers for the purpose.

The form of construction and the method of making the box illustrated in Figures 12 to 20 inclusive, is the same as that illustrated in Figures 1 to 8 inclusive and Figure 21, except that in the first mentioned construction the front and rear wall outer segments 7 are secured to the inside of the box and the end wall inner segments 8 are secured to the outside of the box. In the method of securing this result a blank Figure 12, which is identical to the blank shown in Figure 1, is adhesively treated at predetermined areas 23 (Fig. 13), the blank is then folded on lines 12, 13, 17 and 18 with the result that front and rear wall outer segments 7 will contact the adhesively treated areas 23. The blank is then in the condition illustrated by Figure 14. Adhesive is then applied to predetermined areas 24 (Fig. 15) on the upward facing surfaces of end walls 4 and 5. The blank is then folded on lines 10, 11, 14 and 15, with the result that end wall inner segments 8 will contact the adhesively treated areas 24, thus completing the box in collapsed condition.

While I have illustrated and described the preferred forms of construction for carrying my invention into effect, these are capable of variation and modification without departing from the spirit of the invention.

I have shown the cut lines 19 and 20 (Figs. 1 and 9) as the preferred form of cuts to be provided in the blank, but the cuts may be varied without departing from my invention, some of such variations are shown in Figures 9, 10 and 11.

The score lines 11, 14 and 15 are shown as being in straight lines (Figs. 1 and 9), as are score lines 13, 17 and 18, also score lines 16 and 21 are shown in straight lines. These score lines are illustrated in this way for simplicity, but in practice it may be desirable, when fairly thick material is used, to have some of the lines slightly out of line with each other, or at a slight angle with each other in order to compensate for the thickness of the material from which the box blank is made and to permit folding the walls and corners of the box to flat condition and so that the box may be set up without binding or cramping.

Instead of applying adhesive to areas 21 (Fig. 2), 22 (Fig. 4), 23 (Fig. 13), and 24 (Fig. 15), the adhesive may be applied directly to the wall segments 7 and 8, without departing from the spirit of my invention.

I have shown as a preferred embodiment of my invention, that end wall inner segments 8 should be secured to the end walls 4 and 5 at areas 21 (Fig. 2), but it is not necessary that said segments 8 be so secured, because the box will be effective for many uses without being fastened to the inside of the end walls.

Creased line 15 (Figs. 1, 2 and 12) is shown as the preferred construction but said line may be cut instead of creased without departing from the spirit of my invention.

Having described my invention, what I claim is:

1. A folding box made from a creased and cut blank comprising a bottom, upright front and rear walls and a pair of end walls, a connection at each corner of the box integral with the upper portion of the end edge of the end wall and the adjacent end edge of the corresponding front or rear wall, the said connection being folded against the outside surface of the corresponding front or rear wall and being secured thereto, a bellows fold connection at each corner of the box integral with the lower portion of the end edge of the end wall and the adjacent end edge of the corresponding front or rear wall, said bellows fold connection being folded against the inside surface of the corresponding end wall and being secured thereto.

2. A folding box made from a creased and cut blank comprising a bottom, upright front and rear walls and a pair of end walls, a connection at each corner of the box integral with the upper portion of the end edge of the end wall and the adjacent end edge of the corresponding front or rear wall, the said connection being folded against the inside surface of the corresponding front or rear wall and being secured thereto, a bellows fold connection at each corner of the box integral with the lower portion of the end edge of the end wall and the adjacent end edge of the corresponding front or rear wall, said bellows fold connection being folded against the outside surface of the corresponding end wall and being secured thereto.

3. A folding box made from a creased and cut blank comprising a bottom, upright front and rear walls and a pair of end walls, a connection at each corner of the box integral with the upper portion of the end edge of the end wall and the adjacent end edge of the corresponding front or rear wall, the said connection being folded against the corresponding front or rear wall, a bellows fold connection at each corner of the box integral with the lower portion of the end edge of the end wall and the adjacent end edge of the corresponding front or rear wall, said bellows fold connection being folded against the corresponding end wall, one of the aforesaid connections being secured to the outside of the box and the other connection secured to the inside of the box.

RODERICK WM. HOAG.